United States Patent Office 3,696,029
Patented Oct. 3, 1972

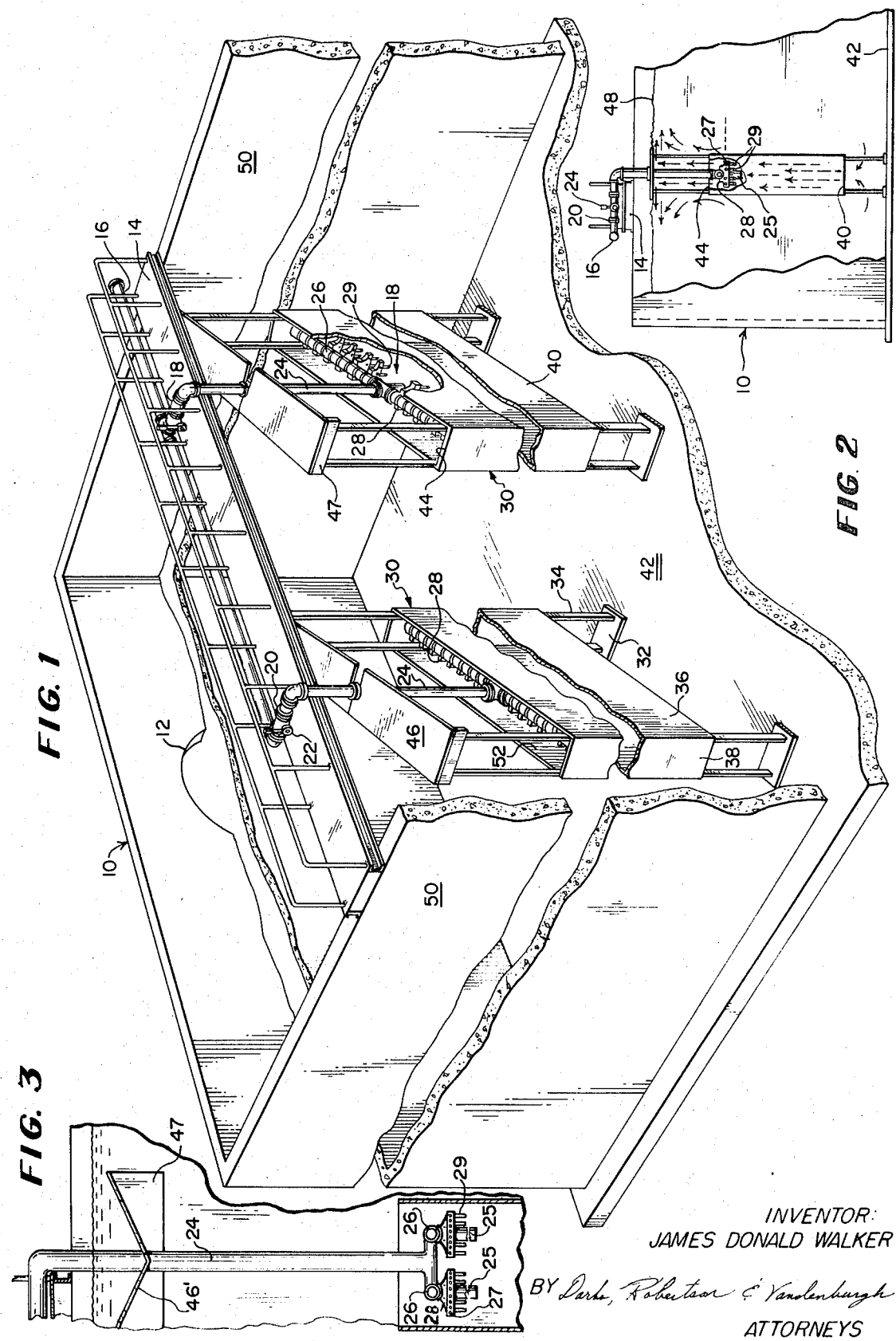

3,696,029
DEEP TANK AERATION USING EDUCTOR TUBES
OF ELONGATE CROSS-SECTION
James Donald Walker, Aurora, Ill., assignor to Chicago
Bridge & Iron Company
Filed Mar. 16, 1970, Ser. No. 19,989
Int. Cl. C02c 1/12
U.S. Cl. 210—14
19 Claims

ABSTRACT OF THE DISCLOSURE

Aeration of huge quantities of sewage in very deep tanks is made practicable by efficient use of eductor tubes. The air is liberated at only a moderate depth, the tubes extend downwardly from only slightly above the level of liberation, and the tubes are elongate in horizontal cross-section for effective utilization of the full cross-section. There is a baffle at surface level above the tubes.

INTRODUCTION

In sewage treatment, aeration efficiency is extremely important. A large part of the cost of operating sewage treatment plants is in compressing the air for liberation in the aeration tanks. It has been nearly standard practice to liberate the air near the bottom of the tanks, the location of air liberation being chosen to stir the tank as well as aerate it. A general desire to use air pumped at a pressure of the order of seven p.s.i. has been a factor tending to limit depth. This pressure can be provided efficiently with non-wiping rotary pumps such as lobe pumps or centrifugal pumps without requiring excessive speed. Furthermore higher pressures are inherently inefficient because the heat of compression represents energy wasted, and objectionable to the extent it heats the liquor.

Because of land costs, there has been a desire to reduce the land requirements by making aeration tanks deeper. In a few instances deep tanks have been used and in a very few instances deep stirring has been used with eductor tubes. Liberation of air at intermediate depths in the length of such an eductor tube makes it an air lift pump, drawing the contents of the tank from a point near the bottom of the tank and discharging it near the top.

In spite of these few instances, open aeration, i.e., liberating the air without eductor tubes, has been the usual or standard process. It has not been apparent that the cost of eductor tubes could be justified, and there have been doubts of efficiency, especially as to extremely large cross-sections which would seem to be indicated for extending the minor past eductor tube practice to larger and larger tanks.

According to the present invention, prior doubts (whether justified or not) have been largely overcome by achieving greater constructional and operational efficiency in the use of eductor tubes for aeration, especially in extremely deep tanks. The efficient use of tube cross-sections for huge volumes is achieved by using elongate cross-sections, such as rectangular tubes, with the tube favorably placed for setting up a double-roll of the tank contents effective for stirring a very large area of the tank. Efficiency of construction is achieved in part by having the top of the eductor tubes not more than slightly above the level of air liberation. Whereas it has previously been assumed that eductor tubes should extend far above the point of air liberation therein, it now appears to be entirely adequate, in a system in which a rolling action of the tank contents is established, that the eductor tube extends far enough above the air liberation level for the air to have completed its initial rapid expansion upon liberation. Great roll-producing efficiency is achieved, at least when a surface level baffle is used, in that the water rising through most of the height through which the air is present in it has no surface friction with a fixed wall. Of course the rising water has friction with the surrounding water, but that friction is not wasted inasmuch as it tends to raise the adjacent water and thus help set up the rolling action, the kinetic energy of the rising water being converted to high speed flow of the water away from the rising area in both directions with the aid of the surface baffle. Tests by other workers extending over several years using deoxygenated water with variations of the basic concepts of this invention (divulged to them by this inventor) indicate a surprising transfer efficiency ranging from 10 to 12%.

DESIGNATION OF THE FIGURES

FIG. 1 is a fragmentary perspective view showing a portion of a sewage treatment plant improved in accordance with this invention.

FIG. 2 is a schematic fragmentary elevational view, showing one of the aeration units of FIG. 1 as viewed from a narrow side thereof.

FIG. 3 is a somewhat similar view of a modification.

DESCRIPTION OF PREFERRED EMBODIMENT

A deep aeration tank is equipped with a sewage inlet, diagrammatically illustrated by liquor inlet means 12, at one end thereof, and corresponding liquor outlet means (not shown) at the other end thereof. Crosswalks or bridges 14 are desirable in the use of this invention. They facilitate servicing of equipment, and usually extend completely across tank 10, bracing its sides. Main air conduit 16 is supported by crosswalk 14 and supplies air from compressors (not shown) to horizontal headers, generally 18. Air from air main 16 is conveyed to headers 18 by way of short horizontal legs 20, which are fitted with valves 22, and through risers 24. In the illustrated embodiment risers 24 join headers 26 approximately at midpoint. A blowoff leg 25, normally water-sealed, extends down in alignment with riser 24 (FIG. 2). A large number of air orifices 27 at one level are provided by multispargers 28 having orifices along both side faces thereof. Tubes 29, extending below multispargers 28 as taught in Pat. 3,501,133, provide additional air outlets (through open bottoms) at the high flow rates usually used, and provide drainage. Air outlets are positioned to disperse air substantially uniformly throughout the entire cross-section of an eductor tube 30 in which the header is located. In the illustrated embodiment of FIG. 1 only one riser 24 and one header 26 are shown, but usually there would be at least two headers in parallel arrangement, as in FIG. 3. The long horizontal dimension of the eductor tubes 30 may be such as to have a succession of aligned headers in which case they may be supported by risers on opposite sides of bridge 14. Multispargers 28 have intermediate orifices between the end groups illustrated in said patent.

In accordance with this invention the air is liberated at a depth suitable for efficient pumping, e.g., 12 feet, even though this is far above the tank floor and may in some cases be only ½ to ¼ of the depth of the liquor in the tank.

Eductor tube 30, in the illustrated embodiment, is supported by base plates 32, and vertical support members 34, and is made up of elongated sidewalls 36 and narrow sidewalls 38. Sidewalls 36, 38 are fixed to the vertical support members 34 and are positioned so that the bottom 40 of the tube 30 defined by sidewalls 36, 38 are suitably above floor 42 of tank 10. It should be close enough so that liquor will be drawn along the floor of the tank to prevent settling of biological sludge thereon. It should be spaced above the bottom preferably at least equal to the spacing between walls 36, to give easy entry of the liquors into the tube, and may be higher for economy, so long as satisfying the previous sentence. Top edge 44 of eductor tube 30 is preferably about two feet above the primary or upper orifices of multisparger 27.

Baffle 46 to convert upward flow to horizontal flow is also supported by vertical support members 34, and is positioned to reside at water level 48 of the tank.

Preferably these are about 25% wider in their short dimension than the corresponding dimension of eductor tubes 30 and are provided with end skirts 47 to minimize axial blow-off. A preferred form of baffle 46 is seen in FIG. 3, this form being submerged at its top about a foot but having inclined faces which leave an upward component in the outflow. This form of baffle may also be used over open air diffusion in tanks of ordinary depth.

It is noted that in the illustrated embodiment the elongated cross-section eductor tubes 30 are positioned on the bias with respect to the general direction of flow, i.e., with respect to the general direction from inlet tube 12 through the tank. Usually the tank is quite long, having two or several bridges 14 with eductor tube aerator beneath each. The eductor tubes 30 are also positioned on the bias with respect to sidewalls 50 of tank 10. In the illustrated embodiment FIG. 2 shows, approximately according to scale, the relationship between the dimensions of the deeply positioned eductor tubes and the depth of the tank 10, in one suitable embodiment. In the illustrated embodiment the primary orifices of spargers 27 may be assumed to be approximately 12 feet below water level 48. The level chosen is preferably the deepest which will not impair the efficiency of the chosen compressors, preferably one of the non-wiping rotary types.

Sidewall 38 should be sufficiently wide to provide a distance greater than two feet between inner faces 52 of sidewalls 36, for efficient flow. With less distance between inner faces 52 of sidewalls 36, the impact of surface drag becomes relatively objectionable. However, narrow sidewall 38 should not be elongated to such an extent that more than about six feet of space separates inner faces 52 of sidewalls 36. The water then has too far to flow from the center in discharging from tube 30. The preferred distance between sidewalls 36 is about four feet. The use of parallel headers makes practical the use of multisparger units of conventional contour, these being available at relatively low cost. Additional orifices can be provided economically.

OPERATION

Air is supplied to headers 18 through main 16 which is connected to a conventional comressor (not shown). Inasmuch as the depth of air injection orifices 27, 29 is approximately 12 feet, the conventional, widely uesd non-wiping compressors which provide six and one-half to seven and one-half p.s.i. compression at desirable operating speeds are entirely satisfactory. Hence, tanks substantaily deeper than 15 feet (heretofore often considered an approximate limit) become thoroughly practical. Extremely deep tanks, e.g., greater than 24 feet in depth, particularly 36 feet, 48 feet and greater depths can be used and are unexpectedly efficient. The minimum depth likely to be used involves balancing the cost of eductor tubes against other factors. A 20 foot tank will usually clearly justify the cost. Because of eductor tube efficiency (due to the novel combination of features including the spacing of the tubes for huge far-reaching tank-deep rolls, the horizontal elongation of the tubes parallel to the roll axes, the point of injection, the depth of eductor tube 30, and the termination point, i.e., top 44 of the eductor tube, and the energy diverting baffles) the relatively low-pressure dispersion of air into the liquor not only provides efficient mixing of air and liquor, but moreover provides extremely efficient intermixing of the entire contents of the tank 10. Thus liquor from the very bottom regions adjacent bottom 42 is drawn through eductor tube 30, and carried at relatively high velocity upwardly against baffle 46. In tests carried out to date, solids do not collect on bottom 42, in spite of the great depth of the tank.[1] Due to the presence of baffle 46 the mass of rising water is deflected laterally, as indicated in FIG. 2, with minimum loss of kinetic energy. Due to the resulting great velocity of liquor, and efficient dispersion of gas bubbles and the deflection by baffle 46, the residence time of gas bubbles within the liquor is increased.

With the top 44 of eductor tubes 30 lowered to not far above the air injection level, it might be expected that there would be poor efficiency in terms of water lift upwardly through eductor tubes 30. Nonetheless it has been observed in test installations that the uplift is surprisingly effective, and that due to the high velocity of liquor adjacent floor 42 substantially no solid deposits are observed on bottom 42.

Inasmuch as top 44 of eductor tube 30 terminates about two feet above upper air orifices of spragers 27, and inasmuch as a relatively high velocity liquor stream flows up from eductor tubes 30, the drag on the surrounding liquor causes liquor in the region surrounding the rising column to be drawn upwardly, thus enhancing the effect of the eductor tube aerator system of this invention in generating relatively large horizontal rolls of liquor on both sides of eductor tubes 30. These large rolls of liquor have a horizontal axis substantially parallel to eductor tube sidewalls 36. Moreover, in addition to the high degree of liquid mixing provided in the region above top 44 of eductor tube 30, due to the great difference in velocity between closely adjacent regions in the liquor, the entire contents of deep tank 10 are thoroughly and continually intermixed as a result of the operation of the novel deeply positioned eductor tube aeration system of this invention. The interactions between each biased roll and the walls or other rolls provides an unbalanced effect which sets up stray currents reaching all points of the tank, even in the center area of the rolls which have heretofore been thought of as dead areas.

Because of the relatively high velocity of liquid moving sideways from immediately below baffle 46 and because of the generation of the relatively rapidly revolving horizontal rolls on both sides of eductor tube 30, air bubbles tend to remain entrained in the liquor moving sideways from baffle 46 and be carried downwardly around the outer region of the horizontal roll, whence some of the bubbles find their way, rising upwardly, through the entire cross-sections of the rolls on both sides of eductor tube 30.

Preferably there are a plurality of eductor tubes 30 so positioned that they form a jogging line. Preferably they are axially separated, i.e., the plane of the short sidewall 38 of one eductor tube 30 is spaced from the adjacent eductor tube. With this arrangement, the horizontal rolls which are generated by the adjacent eductor tubes 30 rotate freely, relatively unimpeded by the adjacent eductor tube wall. Nevertheless the non-aligned relationship of adjacent eductor tubes provides localized regions of high relative velocity and turbulence because of the opposing and conflicting liquid flows. This greatly enhances the general mixing effect.

The rate of air introduction should be such as to provide vigorous rolls. Air introduction of at least 15 c.f.m./sq. ft. of eductor tube cross-section is believed to be desirable from this standpoint. Beyond that, each operator is likely to be governed by the needs of his plant. An operator who desires to determine the best rate of air introduction can do so during operation of his installation by tests, including dissolved oxygen tests. For full advantage of this invention, air introduction should be such as to yield oxygen transfer efficiency of at least

---

[1] The areation tank of this invention should be preceded by screening and primary settling to remove grit, rags, etc.

6½% at 2 p.p.m. dissolved oxygen and on the basis of an average mixture of industrial waste and domestic sewage. If standard tests with deoxygenated water are practicable, the rate of air introduction should yield at least about 10% oxygen transfer. Inasmuch as 12% has been found to be available in at least one instance, tests should seek an air introduction rate which would achieve this, or 7½% oxygen transfer in mixed wastes on the basis stated. Introduction of air at a rate of 20–25 c.f.m./sq. ft. appears to be ideal. Above about 33 c.f.m./sq. ft. is believed to be wasteful, although it could be resorted to in instances of B.O.D. loading higher than had been anticipated in the design of the plant, if found to achieve a higher percentage of dissolved oxygen.

ACHIEVEMENT

Because of the moderate depth of air liberation, in accordance with this invention, deep tank aeration and mixing is made possible with conventional, relatively low pressure compressors of the widely used and efficient non-wiping types, running at acceptable speeds. Such compressors are presently available in connection with present conventional systems using relatively shallow tanks (such as 15 feet deep). To achieve most efficient use of presently available air compressors in this invention, air injection should be at least at about 10 feet and preferably no lower than 14 feet submergence. Substantial quantities of liquor are continuously drawn from the bottom of the tank and double horizontal rolls are formed, each of which extends through the full depth of liquor in the tank. These factors aid in mixing of the entire tank contents especially when rolls are positioned to collide with portions of other rolls or tank walls. In aeration tests in tanks of great depth, solids were not observed to settle on the tank bottom, and extremely efficient mixing and air utilization has been observed using this invention. In spite of the highly efficient aeration and mixing, and in spite of the fact that relatively deep tanks can be equipped with compressors of the type presently used in relatively shallow tanks, the apparatus of this invention is extremely simple and economical to construct and maintain. Both for economy and efficiency the eductor tubes should be spaced far apart so that the rolling action will not be cramped. Each longitudinal roll may well extend 15 to 50 feet, or even more, from the eductor tube producing it, or further, depending partly on tank depth. Surprising oxygen transfer efficiencies have been attained.

MEANING OF "AIR" IN CLAIMS

The term "air" used in the claims connotes two important attributes: the buoyance of a gas for stirring and the substantial oxygen content for supporting the biochemical reaction. The words "air" and "aeration" should not be taken as requiring true or atmospheric air.

I claim:

1. An aeration system for aerating and completely stirring the contents of a tank deeper than can be efficiently stirred by given pump means using open air liberation characterized by:
    an eductor tube horizontally elongated in cross-section and so located in the tank as to produce, when air is liberated therein, huge tank-deep rolls moving in opposite directions about axes generally parallel to the direction of horizontal elongation of the tube cross-section, the eductor tube extending at least from the level of air liberation downwardly a substantial distance and close enough to the tank bottom to draw liquor along the bottom of the tank,
    and air distribution means for injecting air into liquor within the eductor tube substantially evenly throughout the entire horizontal cross-section of the eductor tube at the level of air injection, the level of air injection being at a depth of at least ten feet for which the given pump is efficient.

2. An aeration system for aerating and completely stirring the contents of a tank deeper than can be efficiently stirred by given pump means using open air liberation characterized by:
    an eductor tube horizontally elongated in cross-section and so located in the tank as to produce, when air is liberated therein, huge tank-deep rolls moving in opposite directions about axes generally parallel to the direction of horizontal elongation of the tube cross-section, the eductor tube extending from only slightly above the level of air liberation downwardly a substantial distance and close enough to the tank bottom to draw liquor along the bottom of the tank,
    and air distribution means for injecting air into liquor within the eductor tube substantially evenly throughout the entire horizontal cross-section of the eductor tube at the level of air injection, the level of air injection being at a depth of at least ten feet for which the given pump is efficient.

3. An aeration system for aerating and completely stirring the contents of a tank deeper than can be efficiently stirred by given pump means using open air liberation characterized by:
    an eductor tube horizontally elongated in cross-section and so located in the tank as to produce, when air is liberated therein, huge tank-deep rolls moving in opposite directions about axes generally parallel to the direction of horizontal elongation of the tube cross-section, the eductor tube extending at least from the level of air liberation downwardly a substantial distance and close enough to the tank bottom to draw liquor along the bottom of the tank,
    and air distribution means for injecting air into liquor within the eductor tube substantially evenly throughout the entire horizontal cross-section of the eductor tube at the level of air injection, the level of air injection being at a depth of at least ten feet for which the given pump is efficient,
    and a baffle widely spaced over the eductor tube and approximately at or a slightly below surface level to convert upward velocity to horizontal velocity.

4. An aeration system for aerating and completely stirring the contents of a tank deeper than can be efficiently stirred by given pump means using open air liberation characterized by:
    an eductor tube horizontally elongated in cross-section and so located in the tank as to produce, when air is liberated therein, huge tank-deep rolls moving in opposite directions about axes generally parallel to the direction of horizontal elongation of the tube cross-section, the eductor tube extending from only slightly above the level of air liberation downwardly a substantial distance and close enough to the tank bottom to draw liquor along the bottom of the tank,
    and air distribution means for injecting air into liquor within the eductor tube substantially evenly throughout the entire horizontal cross-section of the eductor into at the level of air injection, the level of air injection being at a depth of at least ten feet for which the given pump is efficient,
    and a baffle widely spaced over the eductor tube and approximately at or slightly below surface level to convert upward velocity to horizontal velocity.

5. An aeration system for aerating and completely stirring the contents of a tank deeper than can be efficiently stirred by given pump means using open air liberation characterized by:
    an eductor tube horizontally elongated in cross-section and so located in the tank as to produce, when air is liberated therein, huge tank-deep rolls moving in opposite directions about axes generally parallel to the direction of horizontal elongation of the tube cross-section, the eductor tube extending at least from the level of air liberation downwardly a substantial distance and close enough to the tank bottom to draw liquor along the bottom of the tank, air distribution means for injecting air into liquor within the eductor tube substantially evenly throughout the entire horizontal cross-section of the eductor tube at the level of air injection, the level of air injection being at a depth of at least ten feet for which the given pump is efficient, and a baffle widely spaced over the eductor tube to convert upward velocity to horizontal velocity at the surface, said baffle having lower face portions sloping downwardly toward a line above the long horizontal midline of the eductor tube from lines no higher than about surface level above the long sides of the eductor tube.

6. An aeration system for aerating and completely stirring the contents of a tank deeper than can be efficiently stirred by given pump means using open air liberation characterized by:

an eductor tube horizontally elongated in cross-section and so located in the tank as to produce, when air is liberated therein, huge tank-deep rolls moving in opposite directions about axes generally parallel to the direction of horizontal elongation of the tube cross-section, the educator tube extending at least from the level or air liberation downwardly a substantial distance and close enough to the tank bottom to draw liquor along the bottom of the tank, air distribution means for injecting air into liquor within the eductor tube substantially evenly throughout the entire horizontal cross-section of the eductor tube at the level of air injection, the level of air injection being at a depth of at least ten feet for which the given pump is efficient, and a baffle widely spaced over the eductor tube to convert upward velocity to horizontal velocity at the surface, said baffle being substantially entirely below surface level and having lower face portions sloping downwardly toward a line above the long horizontal midline of the eductor tube.

7. An aeration and stirring system for deep tanks characterized by:

an eductor tube horizontally elongated in cross-section and so located in the tank as to produce, when air is liberated therein, huge tank-deep rolls about axes generally parallel to the direction of horizontal elongation of the tube cross-section, and moving horizontally in opposite directions at least 15 feet; the eductor tube extending from at least the level of air liberation downwardly a substantial distance and close enough to the tank bottom to draw liquor along the bottom of the tank, and air distribution means supplied by given pumping means for injecting air into liquor within the eductor tube substantially evenly throughout the entire horizontal cross-section of the eductor tube at the of air injection, the lveel of air injection being at a depth of about 10 to 14 feet for which the given pumping means is efficient.

8. An aeration and stirring system for deep tanks characterized by:

an eductor tube horizontally elongated in cross-section and so located in the tank as to produce, when air is liberated therein, huge tank-deep rolls about axes generally parallel to the direction of horizontal elongation of the tube cross-section, and moving horizontally in opposite directions at least 15 feet; the eductor tube extending from at least the level of air liberation downwardly a substantial distance and close enough to the tank bottom to draw liquor along the bottom of the tank, air distribution means supplied by given pumping means for injecting air into liquor within the eductor tube substantially evenly throughout the entire horizontal cross-section of the eductor tube at the level of air injection, the level of air injection being at a depth of about 10 to 14 feet for which the given pumping means is efficient, and a baffle widely spaced over the eductor tube to convert upward velocity to horizontal velocity at the surface.

9. An aeration and stirring system for deep tanks characterized by:

an eductor tube horizontally elongated in cross-section and so located in the tank as to produce, when air is liberated therein, huge tank-deep rolls about axes generally parallel to the direction of horizontal elongation of the tube cross-section, and moving horizontally in opposite directions at least 15 feet; the eductor tube extending from at least the level of air liberation downwardly a substantial distance and close enough to the tank bottom to draw liquor along the bottom of the tank, air distribution means supplied by given pumping means for injecting air into liquor within the eductor tube substantially evenly throughout the entire horizontal cross-section of the eductor tube at the level of air injection, the level of air injection being at a depth of about 10 to 14 feet for which the given pumping means is efficient, and a baffle widely spaced over the eductor tube to convert upward velocity to horizontal velocity at the surface, said baffle having lower face portions sloping downwardly toward a line substantially lower than the surface and which is substantially directly above the long horizontal midline of the eductor tube.

10. An aeration and stirring system for deep tanks characterized by:

an eductor tube horizontally elongated in cross-section and so located in the tank as to produce, when air is liberated therein, huge tank-deep rolls about axes generally parallel to the direction of horizontal elongation of the tube cross-section, and moving horizontally in opposite directions at least 15 feet; the eductor tube extending from at least the level of air liberation downwardly a substantial distance and close enough to the tank bottom to draw liquor along the bottom of the tank, and air distribution means supplied by given pumping means for injecting air into liquor within the eductor tube substantially evenly throughout the entire horizontal cross-section of the eductor tube at the level of air injection, the level of air injection being at a depth of about 10 to 14 feet for which the given pumping means is efficient;

said eductor tube being arranged with its elongation on a bias with respect to the tank walls to produce unbalanced flow forces in the tank.

11. An aeration and stirring system for deep tanks characterized by:

a plurality of eductor tubes each horizontally elongated in cross-section and so located in the tank as to produce, when air is liberated therein, huge tank-deep rolls about axes generally parallel to the direction of horizontal elongation of the tube cross-section, and moving horizontally in opposite directions at least 15 feet; each eductor tube extending from at least the level of air liberation downwardly a substantial distance and close enough to the tank bottom to draw liquor along the bottom of the tank; the eductor tubes being distributed to include substantially the entire tank contents in the rolls they produce;

and air distribution means supplied by given pumping means for injecting air into liquor within each eductor tube substantially evenly throughout the entire horizontal cross-section of the eductor tubes at the level of air injection, the level of air injection being at a depth of about 10 to 14 feet for which the given pumping means is efficient;

the eductor tubes being arranged in the tank to produce unbalanced flow forces between adjacent rolls.

12. An aeration and stirring system for deep tanks characterized by:

an eductor tube horizontally elongated in cross-section and air distribution means for injecting air into liquor within the eductor tube substantially evenly throughout the entire horizontal cross-section of the eductor tube at the level of air injection, air supply piping for positioning the level of air injection at a submergence depth of about 10 to 14 feet; the eductor tube having its top substantially below the surface level and extending from at least the level of air liberation downwardly a substantial distance to draw liquor from far below the level of air liberation.

13. An aeration and stirring system for deep tanks characterized by:

an eductor tube horizontally elongated in cross-section and air distribution means for injecting air into liquor within the eductor tube substantially evenly throughout the entire horizontal cross-section of the eductor tube at the level of air injection, air supply piping for positioning the level of air injection at a submergence depth of about 10 to 14 feet; the eductor tube having its top substantially below the surface level and extending from at least the level of air liberation downwardly a substantial distance to draw liquor from far below the level of air liberation, and a baffle widely spaced over the eductor tube to convert upward velocity to horizontal velocity at the surface.

14. An aeration and stirring system for deep tanks characterized by:

an eductor tube horizontally elongated in cross-section and air distribution means for injecting air into liquor within the eductor tube substantially evenly throughout the entire horizontal cross-section of the eductor tube at the level of air injection, air supply piping for positioning the level of air injection at a submergence depth of about 10 to 14 feet, the eductor tube having its top substantially below the surface level and extending from only slightly above the level of air liberation downwardly a substantial distance to draw liquor from far below the level of air liberation, and a baffle widely spaced over the eductor tube to convert upward velocity to horizontal velocity at the surface.

15. An aeration and stirring system for deep tanks characterized by:

an eductor tube horizontally elongated in cross-section and so located in the tank as to produce, when air is liberated therein, huge tank-deep rolls about axes generally parallel to the direction of horizontal elongation of the tube cross-section, and moving horizontally in opposite directions at least 15 feet; the eductor tube extending from at least the level of air liberation downwardly a substantial distance and close enough to the tank bottom to draw liquor along the bottom of the tank, air distribution means supplied by given pumping means for injecting air into liquor within the eductor tube substantially evenly throughout the entire horizontal cross-section of the eductor tube at the level of air injection, the level of air injection being at a depth of about 10 to 14 feet for which the given pumping means is efficient, and a baffle widely spaced over the eductor tube to convert upward velocity to horizontal velocity at the surface, including end skirts for resisting diversion of the flow from said opposite directions.

16. An aeration and stirring system for deep tanks characterized by:

an eductor tube having in horizontal cross-section substantially flat horizontally elongate opposite sides and connecting sides and so located in the tank as to produce, when air is liberated therein, huge tank-deep rolls about axes generally parallel to said opposite sides, and moving horizontally in opposite directions at least 15 feet; the educator tube extending from the level of air liberation downwardly a substantial distance and close enough to the tank bottom to draw liquor along the bottom of the tank, air distribution means supplied by given pumping means for injecting air into liquor within the eductor tube substantially evenly throughout the entire horizontal cross-section of the eductor tubes at the level of air injection, the level of air injection being at a depth of about 10 to 14 feet for which the given pumping means is efficient;

and a baffle widely spaced over the air liberation means to convert upward velocity to horizontal velocity at the surface, said baffle including downwardly extending skirts extending generally parallel to said connecting sides for resisting diversion of flow from said directions, and said baffle extending further in said directions than lines directly above said opposite walls.

17. An aeration and stirring system for deep tanks characterized by:

an eductor tube having in horizontal cross-section substantially flat horizontally elongate opposite sides and connecting sides and so located in the tank as to produce, when air is liberated therein, huge tank-deep rolls about axes generally parallel to said opposite sides and moving horizontally in opposite directions at least 15 feet; the eductor tube extending from the level of air liberation downwardly a substantial distance and close enough to the tank bottom to draw liquor along the bottom of the tank, air distribution means supplied by given pumping means for injecting air into liquor within the eductor tube substantially evenly throughout the entire horizontal cross-section of the eductor tubes at the level of air injection, the level of air injection being at a depth of about 10 to 14 feet for which the given pumping means is efficient;

and a baffle widely spaced over the air liberation means to convert upward velocity to horizontal velocity at the surface, said baffle including downwardly extending skirts extending generally parallel to said connecting sides for resisting diversion of flow from said directions.

18. The method of operating an aeration tank at least 19 feet deep and having therein an aeration and stirring system which includes an eductor tube horizontally elongated in cross-section and so located in the tank as to produce, when air is liberated therein, huge tank-deep rolls about axes generally parallel to the direction of horizontal elongation of the tube cross-section, and moving horizontally in opposite directions at least 15 feet; the eductor tube extending at least from the level of air liberation downwardly a substantial distance and close enough to the tank bottom to draw liquor along the bottom of the tank; and air distribution means supplied by given pumping means for injecting air into liquor within the eductor tube substantially evenly throughout the entire horizontal cross-section of the eductor tube at the level of air injection; which method comprises:

discharging air through said distribution means in the eductor tubes at a depth of about 10 to 14 feet for which the given pump is efficient and at a rate to achieve an oxygen transfer efficiency of at least 10% when tested in deoxygenated water, on a 20 degree centigrade basis.

19. The method of operating an aeration tank at least 19 feet deep and having therein an aeration and stirring system which includes a plurality of eductor tubes each horizontally elongated in cross-section and so located in the tank as to produce, when air is liberated therein, huge tank-deep rolls about axes generally parallel to the direction of horizontal elogation of the tube cross-section, and moving horizontally in opposite directions at least 15 feet; each eductor tube extending at least from the level of air liberation downwardly a substantial distance and close enough to the tank bottom to draw liquor along the bottom of the tank; the eductor tubes being distributed to include substantially the entire tank contents in the rolls they produce; and air distribution means suppled by given pumping means for injecting air into liquor within each eductor tube substantially evenly throughout the entire horizontal cross-section of the eductor tubes at the level of air injection; the eductor tubes being arranged in the tank to produce unbalanced flow forces between adjacent rolls; which method comprises:

discharging air through said distribution means in the eductor tubes at a depth of about 10 to 14 feet for which the given pump is efficient and at a rate to achieve an oxygen transfer efficiency of at least 10% when tested in deoxygenated water, on a 20 degree centigrade basis.

References Cited

UNITED STATES PATENTS

| | | | |
|---|---|---|---|
| 3,133,017 | 5/1964 | Lambeth | 210—14 X |
| 2,024,345 | 12/1935 | Elrod | 210—195 |
| 1,867,512 | 7/1932 | Kusch | 210—197 X |
| 3,271,304 | 9/1966 | Valdespino et al. | 210—14 X |
| 2,246,224 | 6/1941 | Streander | 210—195 X |

FOREIGN PATENTS

| | | | |
|---|---|---|---|
| 132,826 | 9/1919 | Great Britain | 210—14 |

MICHAEL ROGERS, Primary Examiner

U.S. Cl. X.R.

210—220; 261—124